United States Patent [19]

Hayden et al.

[11] Patent Number: 4,937,758

[45] Date of Patent: Jun. 26, 1990

[54] METHOD AND APPARATUS FOR REDUCING VIBRATION OVER THE FULL OPERATING RANGE OF A ROTOR AND A HOST DEVICE

[75] Inventors: Richard E. Hayden, Sudbury; Charles S. Ventres, Cambridge, both of Mass.; William J. DiMarco, Portsmouth, R.I.; Mervyn D. Floyd, Nashua, N.H.

[73] Assignee: Technology Integration and Development Group, Inc., Billerica, Mass.

[21] Appl. No.: 94,316

[22] Filed: Sep. 4, 1987

[51] Int. Cl.$^5$ ............................................. B64C 27/72
[52] U.S. Cl. ................................ 364/508; 244/17.11; 73/455
[58] Field of Search .................. 364/508, 566, 424.02, 364/576; 73/178 H, 66, 455, 769; 244/17.11, 17.19, 17.13

[56] References Cited

U.S. PATENT DOCUMENTS

| | | | |
|---|---|---|---|
| 3,710,082 | 1/1973 | Sloane et al. | 364/576 |
| 4,053,123 | 10/1977 | Chadwick | 244/17.11 |
| 4,115,755 | 9/1978 | Cotton | 340/946 |
| 4,238,960 | 12/1980 | Curtis et al. | 364/508 X |
| 4,302,745 | 11/1981 | Johnston et al. | 340/963 |
| 4,435,751 | 3/1984 | Hori et al. | 364/574 |
| 4,480,480 | 11/1984 | Scott et al. | 73/769 |
| 4,485,678 | 12/1984 | Fanuele | 364/508 X |
| 4,488,240 | 12/1984 | Kapadia et al. | 364/508 |
| 4,501,149 | 2/1985 | Konno et al. | 73/587 |
| 4,648,568 | 3/1987 | Phillips | 244/17.19 |
| 4,763,285 | 8/1988 | Moore et al. | 364/551.01 |

*Primary Examiner*—Parshotam S. Lall
*Assistant Examiner*—Thomas G. Black
*Attorney, Agent, or Firm*—Hale and Dorr

[57] ABSTRACT

Disclosed is a system and method for minimizing vibration over the full operating range of a rotor of an apparatus. The system includes a transducer or an array of transducers for resolving up to six degrees of freedom of motion of a rotor support structure. In one embodiment the transducer is a six degree of freedom accelerometer located near the center of gravity of the structure. In addition to the motion transducer, a shaft position reference sensor is connected to the shaft of the rotor and/or rotor support structure. A signal processor that receives signals from the transducer and the shaft position reference sensor produces Fourier coefficients of motion occurring in each degree of freedom. The system utilizes analytical models or empirically derived data to describe the Fourier coefficients of acceleration (or strain) resulting from each of the available rotor adjustments. The system and method also utilizes an analytical or computational optimization scheme which computes the best combination of rotor adjustments to meet criteria specified by the user. This best combination is used to designate the appropriate adjustments.

22 Claims, 4 Drawing Sheets

METHOD AND APPARATUS FOR REDUCING VIBRATION OVER THE FULL OPERATING RANGE OF A ROTOR AND A HOST DEVICE

BACKGROUND OF THE INVENTION

The present invention relates to an apparatus having a rotor, such as a helicopter, and more particularly, it relates to a system and method for reducing vibration or stress induced in the apparatus by the rotor.

Rotors which propel helicopters and other propeller-driven aircraft induce low-frequency vibration in the structure supporting the rotor. The vibrations occur at frequencies starting at the shaft rotation rate and occur at many harmonics of the rotation rate. These vibrations result in structural damage, crew fatigue, and ultimately become one of the primary factors limiting the maximum forward speed of the aircraft. Similar vibrations are produced by fans and compressors in fixed installations as well as by marine propellers.

A primary source of the vibration problems is non-uniform airloads on the blades, although mass imbalance is not uncommon. Aerodynamic anomalies, however, tend to develop recurrently due to blade wear, damage, deformation, etc. The aerodynamic and certain mass and stiffness distribution anomalies have often been called "tracking faults", since a primary observable feature of the uneven airloads or mass distribution is a tendency for the blades to flap and/or deflect unevenly, and thus follow different "tracks." The troublesome manifestation of the aerodynamic and mass imbalance, however, is usually the 1/REV and N/REV vibration, and not the track deviations themselves.

All helicopter rotor trim balancing methods currently employed rely, at least in part, upon making the track of each blade identical. Such optical methods, however, utilize bulky equipment which relies upon an operator in the co-pilot seat and procedures which require considerable flight time. Furthermore, optical methods cannot always "see" the blades during a complete revolution and thus cannot be expected to achieve perfect aerodynamic trim.

Mechanical balancing of rotors with mass imbalance can in many cases be performed with a single accelerometer and a shaft-phase reference sensor. However, uneven airloads cannot be fully diagnosed and corrected with such a technique. Other techniques used to perform the rotor smoothing function rely upon optical tracking in conjunction with one to four accelerometers. Every known rotor smoothing system, however, processes vibration data in such a way that there is an inherent ambiguity in the interpretation of the signatures. This ambiguity comes about because the number of channels processed simultaneously is inadequate to fully separate translational and rotational acceleration components at a given point. Thus, the motion of the helicopter (and in particular the rotor support) in response to a rotor anomaly is incompletely specified in known systems. Furthermore, no known system can deduce the corrections needed from the Fourier coefficients of the motion related to each anomaly.

It is therefore a principal object of the present invention to provide a system and method for minimizing vibration over the full operating range of a rotor of an apparatus which utilizes, as sensed input, only vibration measurements in the structure supporting the rotor and a measure of the shaft position.

It is a further object of the present invention to provide a system and method for minimizing vibration over the full operating range of a rotor of an apparatus that will compensate for both aerodynamically and mechanically induced vibration.

Still another object of the present invention is to provide a system and method for minimizing vibration over the full operating range of a rotor which will provide continuous monitoring and computation of corrections.

Yet another object of the present invention is to provide a system and method for minimizing vibration over the full operating range of the rotor which computes the aerodynamic and mechanical imbalance on any type of rotor through full characterization of the response of the supporting structure and a detailed dynamical model of the mechanics of the rotor.

It is a still further object of the present invention to provide a system and method for minimizing vibration over the full operating range of a rotor which prescribes changes needed in rotor settings through calculations and/or measurements of the effect of mechanical adjustments on the motion of the structure supporting the rotor.

Another object of the present invention is to provide a system and method for minimizing vibration over the full operating range of a rotor that allows a user to utilize the correction algorithms through controlled tests in which blade settings are adjusted and the effect on the structure recorded and interpreted.

SUMMARY OF THE INVENTION

The system and method for minimizing vibration over the full operating range of a rotor of an apparatus of the present invention includes a transducer or an array of transducers for resolving up to six degrees of freedom of motion of a rotor support structure. In one embodiment the transducer is a six degree of freedom accelerometer located near the center of gravity of the structure. (Strain gauges which fully characterize the extensional and rotational motions of the support structure may also be utilized). In addition to the motion transducer, a shaft position reference sensor is connected to the shaft of the rotor and/or rotor support structure.

A signal processor that receives signals from the transducer and the shaft position reference sensor produces Fourier coefficients of motion occurring in each degree of freedom. The system utilizes analytical models or empirically derived data to describe the Fourier coefficients of acceleration (or strain) resulting from each of the available rotor adjustments. The system and method also utilizes an analytical or computational optimization scheme which computes the best combination of rotor adjustments to meet criteria specified by the user. This best combination is used to designate the appropriate adjustments.

These and other objects and features of the present invention will be more fully understood from the following detailed description which should be read in light of the accompanying drawings in which corresponding reference numerals refer to corresponding parts throughout the several views.

DETAILED DESCRIPTION OF THE PREFERRED EMBODIMENTS

Figure 1:
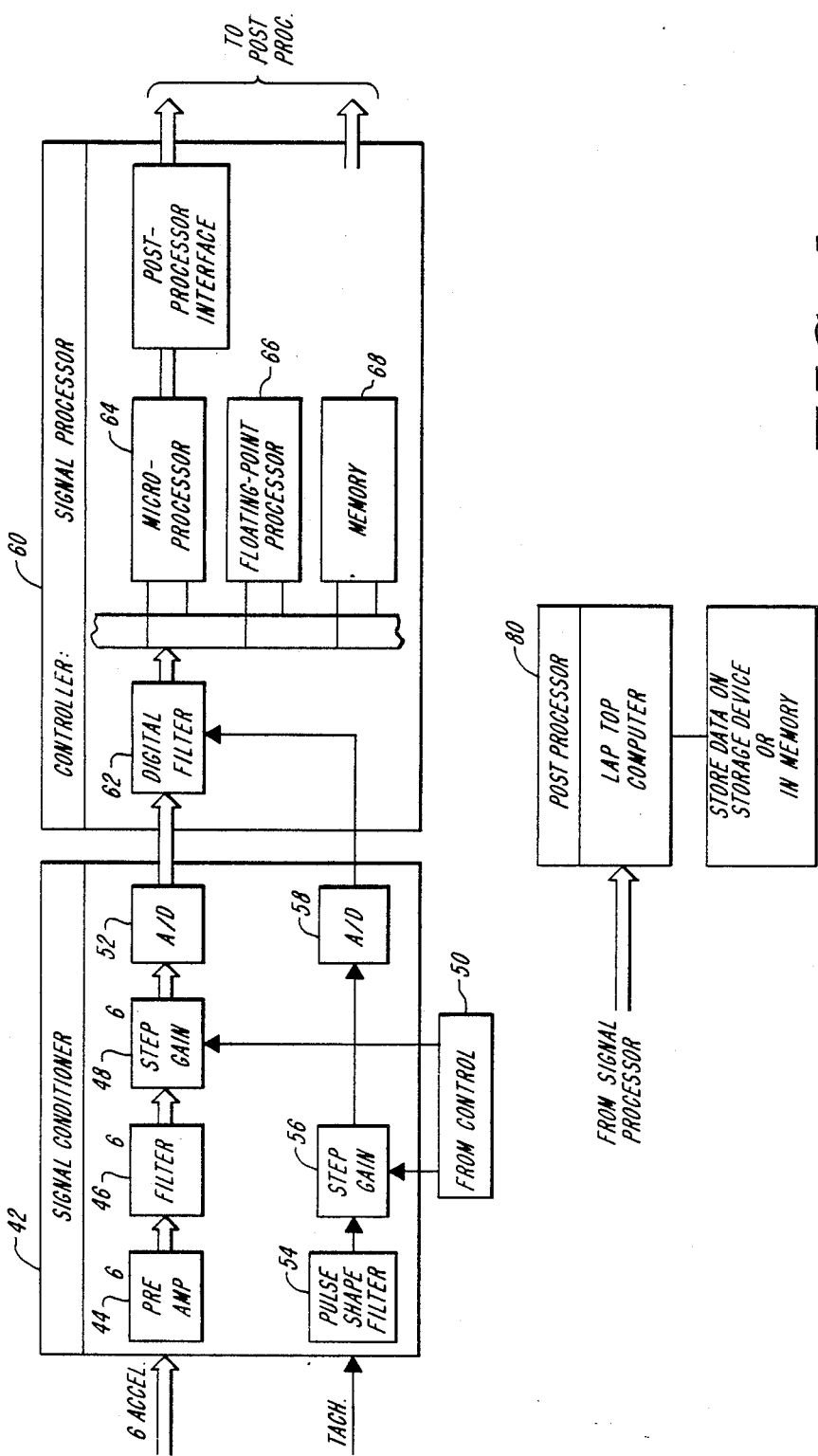
FIG. 1 is a simplified schematic diagram showing the principal components of a system of the present invention.

The following detailed description of the system and method of the present invention is written in terms of measurements of acceleration. Acceleration as used herein is a manifestation of the force and moment exerted by the rotor on the support structure. The motivation is that for the embodiment discussed (a helicopter), measuring acceleration is an appropriate means for determining the force and moment exerted by the rotor. In other circumstances, other techniques for determining force and moment may be more appropriate, such as use of strain of force gauges attached to the support structure.

The system and method of the present invention performs rotor trim and balancing through an analysis of the coherent helicopter (or more generally, rotor support) vibration spectra. To accomplish this trim and balancing, the system requires a shaft position indicator and a sensor or sensors for resolving up to six degrees of freedom of motion of the rotor support structure. In one preferred embodiment, these sensors are accelerometers, and in another embodiment the sensors are strain gauges. A combination of accelerometers and strain gauges can also be used. In multiple rotor apparatus, additional motion sensors and shaft position indicators may be required. In the following discussion, the system and method will be described as applied to a single rotor helicopter. The system may also be used with any other apparatus including one or more rotors.

The system computes shaft position referenced Fourier coefficients of rotation-induced vibrations at several operating conditions. The coefficients are tagged with the operator selected parameter values and stored on a floppy disk. The system, utilizing specific knowledge of the helicopter rotor aerodynamic and mechanical parameters, then processes the data and prescribes required corrective actions. The system design philosophy is that each specific helicopter has its own floppy disk file that remains with the helicopter during its lifetime. Thus, each serial-numbered helicopter will have its own database containing a vibration profile of the helicopter over time, together with the descriptive information regarding flight test conditions and maintenance actions. In addition, a much larger database within a helicopter-type can be maintained off-board to monitor maintenance trends and actions, and in general, improve helicopter fleet availability.

The heart of the system and method of the present invention is the ability to describe the motion of the rotor support due to each of the corrections (adjustments) to the rotor which are possible for the particular rotor type being "tuned". The system receives input regarding vibration of the rotor and it determines the optimum combination of corrections which should be applied to the particular rotor.

Most rotor systems, including that of the present invention allow several classes of adjustments to be made to the rotor for the purpose of reducing vibration. Some of these adjustments are:

1. The angle of attack of each blade can be separately adjusted, such as by changing the length of the pitch link for that blade.

2. One or more tabs or sections on the trailing edge of each blade can be bent up or down (generally bending a tab down generates an aerodynamic pitching moment which twists the trailing edge of the blade up causing the blade itself to flap downward, and vice versa).

3. Small weights can be added to the blades or to the hub at various locations.

As shown in FIG. 1, the system 10 includes a signal conditioner 42, a signal processor 60 and a post processor 80. Because the post-processor 80 determines, from the data provided by the data acquisition and signal processor 60, the optimal set of adjustments to the rotor which will minimize vibration at the frequency of rotation of the rotor, a discussion of its operation at this point will facilitate an overall understanding of the invention.

Figure 2:
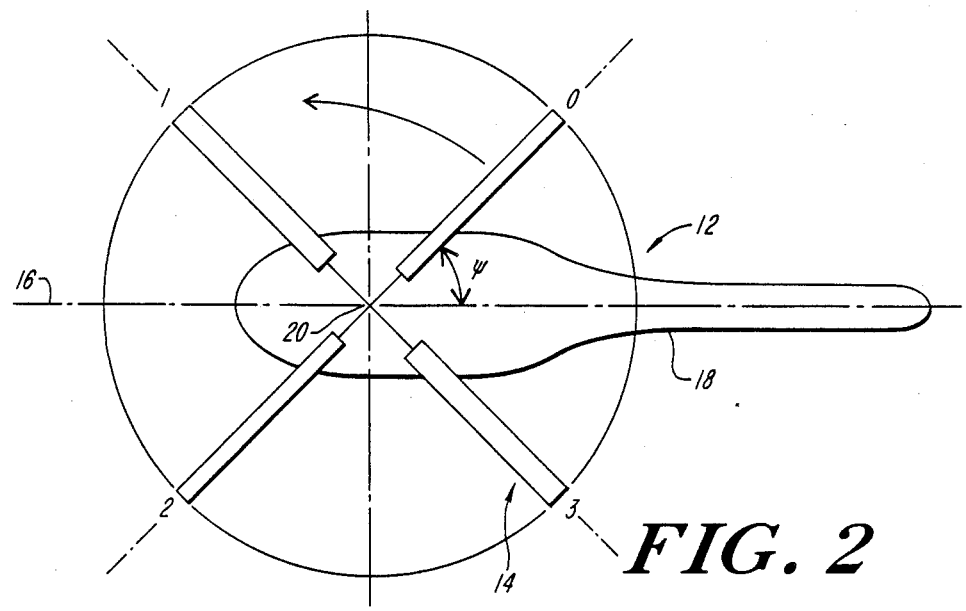
FIG. 2 is a top plan view of a helicopter to which the system shown in FIG. 1 is applied.

Before discussing the specifics of the signal processing performed by the post processor 80, a description of the terminology to be used in the discussion will be provided. Referring to FIG. 2 a typical helicopter 12, is shown having a rotor 14 as viewed from above. One blade 16 of the rotor is selected as a reference blade (the choice is immaterial). Each blade is assigned a number starting with 0 for the reference blade and increasing by one in the direction of rotation. For the four-blade rotor shown in FIG. 1, the blades are numbered 0 through 3, and in general blade indices run from 0 through $B-1$, where B is the number of blades. The position of the reference blade is defined by the azimuth angle $\psi$ between the blade itself and the centerline 16 of the fuselage 18 aft of the rotor hub 20. The blades are equally spaced, so their positions are given by the expression $\psi + b\Delta$, where $\Delta = 2\pi/B$ is the interblade spacing angle, and b is the blade index number.

As the rotor turns, the angle $\psi$ increases. One complete rotation corresponds to an increase in $\psi$ of $2\pi$ radians or 360°. The rate of rotation of the rotor (usually controlled by an engine governor) is very nearly constant, so the azimuth angle $\psi$ is proportional to time. If we denote the rate of rotation by $\Omega$, then $\psi = \Omega t$.

Because of the simple relationship between azimuth angle and time, $\psi$ may also be used as a "dimensionless"-'measure of time. Blade motions and rotor forces, which might normally be thought of as being functions of time, can also be expressed as functions of $\psi$.

The signal conditioner 42 receives six channels of accelerometer data and the signal processor 60 resolves the data into Fourier components (amplitude and phase) at the rotation rate of the rotor and several of its harmonics. The phase is defined with respect to the position sensor mounted on the rotor shaft. This data is corrected by the post processor 80 so that a zero phase angle corresponds to $\psi = 0$ (i.e., to the circumstance that the reference blade is positioned directly over the aft fuselage centerline 16).

Fourier components (amplitude and phase) of the incremental accelerations caused by unit adjustments of the reference blade, (e.g., a 1° deflection of a tab, a pitch link adjustment which causes a 1° change in blade angle of attack, etc.) are also required. This data may be obtained from flight test data using the system of the present invention by systematically making the adjustments discussed above and changing the Fourier coefficients or from analysis, and the data is specific to each particular helicopter configuration and operating condition. From the data (which pertains to unit adjustments applied to the reference blade), acceleration caused by similar adjustments to other blades may be computed. Based upon a dynamical model of the rotor system that particular set of adjustments which most nearly negates the measured acceleration (thereby minimizing vibration) is computed.

To simplify a description of the procedure involved, an example will be discussed which considers only one type of rotor blade adjustment, the trailing edge tab settings, and only one flight condition, which need not be specified. The acceleration generated at the rotor hub 20 by a 1° downward deflection of the trailing edge tab on the reference blade might be denoted by the function $T(\psi)$. (Note that $T(\psi)$ is a vector-valued function, i.e., it has three components $T_x(\psi)$, $T_y(\psi)$ and $T_z(\psi)$, denoting accelerations along each of three orthogonal directions.)

The acceleration generated by a similar 1° deflection of the tab on blade b is then $T(\psi + b\Delta)$, and the acceleration caused by a deflection in the amount $\alpha_b$ is $$\alpha_b T(\psi + b\Delta) \qquad (1)$$

Finally, the acceleration generated by deflections in the amounts $_b$, b=0, 1 .. B−1, which we may denote by a tab, is $$a_{tab} = \sum_{b=0}^{B-1} \alpha_b T(\psi + b\Delta) \qquad (2)$$

In steady flight $T(\psi)$ is a periodic function, as all forces generated by the rotor repeat themselves at the interval of rotation of the rotor, therefore, $T(\psi)$ can be expressed as a Fourier series:

$$T(\psi) = \sum_n T_n e^{-in\psi} \qquad (3)$$

In the complex exponential form of the series shown above, the index n is summed over all integers, positive and negative. From hereon in the detailed description where no summation limits are shown, such an indefinite summation is intended.

Generally speaking, the permitted blade adjustments generate pronounced forces and moments at the rotor rotation rate, and have much less effect at higher frequencies. For the complex Fourier series shown above, this means that the components n such that $-n = \pm 1$ are the largest in magnitude, and component indices greater than 1 or less than −1 are much smaller.

Using this Fourier series for a unit deflection of the tab on the reference blade, it can be shown that the acceleration $a_{tab}$ generated by arbitrary tab deflections on all blades is $$a_{tab} = \sum_n A_n T_n e^{-in\psi} \qquad (4)$$

In this equation the set of quantities $\{A_n\}$ are the discrete Fourier transform of the set of tab deflections $\{\alpha_b; b=0, 1 .. B-1\}$:

$$A_n = \sum_{b=0}^{B-1} \alpha_b e^{-inb} \qquad (5)$$

The $A_n$ are generally complex numbers. They form an infinite periodic sequence, the period being the number of blades, B. Because the tab settings $\alpha_b$ are real numbers, the $A_n$ have the following property (*denotes the complex conjugate):

$$A_{B-n} = A_n^* \qquad (6)$$

Combining this property with the periodicity of the sequence, it can be shown that $A_0$ is a real number, as is (if B is even), $A_{B/2}$.

As can be seen in Equation (4), the $A_n$'s form a frequency mask. If a particular $A_n$ is 0, then the corresponding frequency is not present in the Fourier series for the incremental acceleration caused by the tab settings $\alpha_b$. For example, if on a four blade rotor the trailing edge tabs on each pair of opposing blades are given the same setting, the associated blade forces and motions replicate themselves twice each revolution, so that no net forces are generated at the rotor rotation rate.

The acceleration measured on the untrimmed rotor (the vibration which is to be minimized) is also a (vector-valued) periodic function, and so can be expressed as a complex Fourier series:

$$a = \sum_n a_n e^{-in\psi} \qquad (7)$$

This series is a mathematical representation of the data provided by the data acquisition and signal processor. Including now the additional acceleration caused by the tab deflections, the total acceleration would be:

$$a + a_{tab} = \sum_n (a_n + A_n T_n) e^{-in\psi} \qquad (8)$$

The objective is to minimize the acceleration at the rotation rate of the rotor and at as many harmonics as are significantly affected by the permitted blade adjustments. The primary objective, decreasing vibration at the rotor rotation rate, corresponds to minimizing the mean-square value of the term n=1 in the equation above:

$$\text{Minimize } |a_1 + A_1 T_1|^2 \qquad (9)$$

If the rotor has only two blades, then $A_1$ is a real number. In this case the optimal setting is ($R_e$ means "real" part of):

$$A_1 = -\frac{Re(a_1 \cdot T_1^*)}{|T_1|^2} \qquad (10)$$

whereas if there are three or more blades, $A_1$ is complex and $$A_1 = -\frac{a1 \cdot T_1^*}{|T_1|^2} \qquad (11)$$

The tab settings themselves (as opposed to the frequency masks derived from them) are obtained by solving Equation 5 (in other words by inverting the discrete Fourier transform):

$$a_b = 1/B \sum_{n=0}^{B-1} A_n e^{inb\Delta} \tag{12}$$

Note that in Equation (10) or (11), the condition for minimum vibration at the rotor rotation rate, has determined only $A_1$. More conditions are required to provide the complete definition of the tab settings. One obvious condition to impose is that all tabs not be set at the same angle; such an arrangement changes the blade forces only at multiples of the blade rotation rate, i.e., at rotation orders (0, B, 2B, ... etc.). In terms of the frequency masks A, this is equivalent to requiring that $A_0=0$.

Rotors with four or more blades require yet another condition. For such rotors the opportunity exists (at least in principle) for trimming the rotor to reduce vibration at twice the rotor rotation rate. However, neither pitch link adjustments, trailing edge tabs, nor blade weights have much influence on second harmonic blade forces, so the settings required to have much effect on the vibration at this frequency might be too large for practical use. Ignoring this possibility for the moment, the appropriate setting is obtained by changing the subscript in equations (10) or (11) from 1 to 2. In other words, for a four blade rotor, where $A_2$ is real, $$A_2 = \frac{Re(a_2 \cdot T_2^*)}{|T_2|^2} \tag{13}$$

whereas if there are five blades (so that $A_2$ is complex), $$A_2 = -\frac{a_2 \cdot T_2^*}{|T_2|^2} \tag{14}$$

If the tab settings computed from the above value of $A_2$ are too extreme, any setting which does not increase the vibration at twice the rotation rate would be an acceptable alternative. For example, setting $A_2$ equal to 0 would produce tab settings which would have no effect on the two-per-revolution vibration. With the frequency masks determined, the corresponding optimal tab settings are derived from equation 12. Systems with more blades may minimize vibration at a greater number of frequencies by using the system and method of the present invention.

The foregoing results apply only to one type of rotor adjustment (trailing edge tabs) and one flight condition. Pitch link adjustments and the addition of weights to the blades are handled in the same manner. The only new circumstance to be considered is that all three sets of adjustments become interdependent. This interdependence is the source of some difficulty with traditional trial and error methods of rotor trimming, which allow variations of only one type of adjustments (e.g., trailing edge tabs) at a time. One set of adjustments may be thrown out of kilter by a subsequent step in the process, requiring repetitive adjustments which may or may not converge to an acceptable state of trim.

Pitch link adjustments and blade weight additions and other mechanical adjustments are similar to trailing edge tab adjustments in that they produce incremental forces (or equivalently, accelerations) which can be determined analytically or experimentally and provided as inputs to the post processor. Assuming that the possible adjustments for a helicopter are (1) changing a tab setting, (2) changing the angle of attack of a blade, and (3) changing the weight of the blade and letting $P(\psi)$ be the acceleration produced by a one degree change in the angle of attack of the reference blade and letting $W(\psi)$ be the acceleration produced by the addition or removal of a unit weight to a specified location on the reference blade, similar adjustments or weights added to all blades then produce combined effects as follows:

$$a_{pL} = \sum_{b=0}^{B-1} \theta_b P(\psi + b\Delta) \tag{15}$$

$$a_{wt} = \sum_{b=0}^{B-1} \omega_b W(\psi + b\Delta) \tag{16}$$

where $\omega_b$ and $\theta_b$ are the angle of attack change of and weight added to the bth blade. $P(\psi)$ and $W(\psi)$ are both periodic functions, so $$a_{pL} = \sum_n B_n P_n e^{-in\psi} \tag{17}$$

$$a_{wt} = \sum_n C_n W_n e^{-in\psi} \tag{18}$$

where $P_n$ and $W_n$ are the Fourier coefficients of $P(\psi)$ and $W(\psi)$ and $B_n$, $C_n$ are the discrete Fourier transforms of $\omega_b$ and $\theta_b$:

$$B_n = \sum_{b=0}^{B-1} \theta_b e^{-inb\Delta} \tag{19}$$

$$C_n = \sum_{b=0}^{B-1} \omega_b e^{-inb\Delta} \tag{20}$$

The new total acceleration, including that of the untuned rotor and the contributions of all of the adjustments, is $$a + a_{tab} + a_{pl} + a_{wt} \tag{21}$$

As before, the objective is to minimize the vibration at the rotation rate:

$$\text{MINIMIZE } |a_1 + A_1 T_1 + B_1 P_1 + C_1 W_1|^2 \tag{22}$$

There are 3B independent variables, $a_b$, $\theta_b$, and $\omega_b$, where b=0, 1, 2 .. B−1. Reliable numerical procedures are available for computing the optimum rotor trim settings. (Two examples of such procedures are the Broyden, Fletcher, Goldfard, Shanno (BFGS) method and the Downhill Simplex Method of Nelder and Mead. See *Numerical Recipes*, Press, W. H., et al, Cambridge University Press, 1986.)

The operation of the system and method discussed above tunes a rotor for only one flight condition. Because the settings which are optimal at one speed are in general not be so for others, a rational means for determining an acceptable compromise is required. In the present invention a weighted average of the mean-square accelerations at various flight or operating conditions (e.g., at hover and two or more forward speeds) is formed and a set of blade adjustments which minimizes its weighted average is determined. The weights could be selected by the user to meet his own requirements (e.g. selected in accordance with the type of flights most frequently made). Implementation of such a procedure is straight forward as the quantity being minimized is a linear combination of terms similar to those set out above and the number and definition of independent variables is the same.

Figure 3:
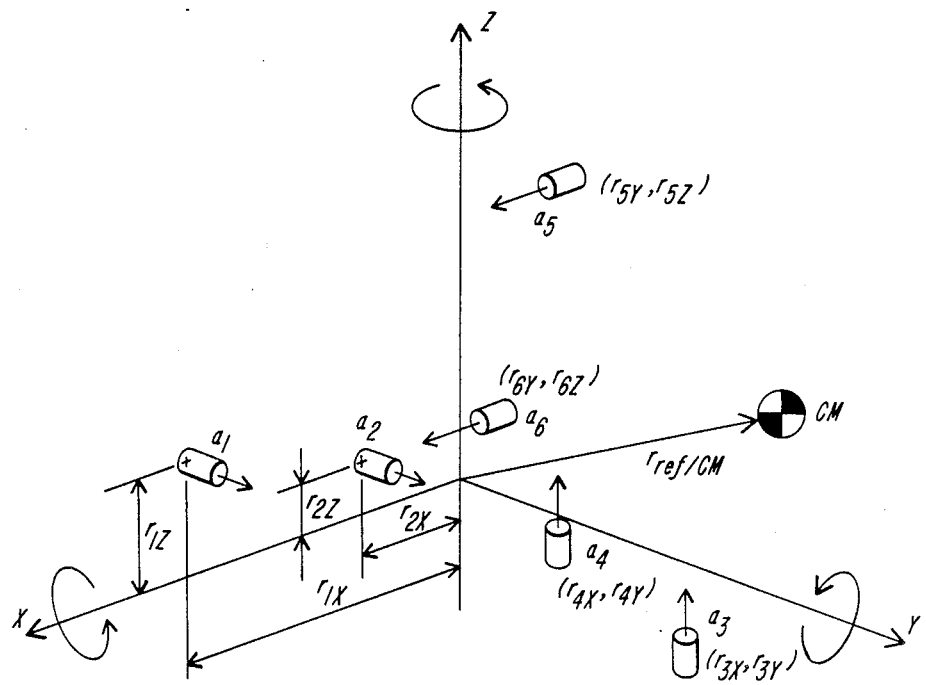
FIG. 3 is a simplified diagram showing the general positioning of six one degree of freedom accelerometer as used in one embodiment to the present invention.

The performance goal for an accelerometer sensor array is to determine a translational acceleration vector $a_{cm}$, and a rotational acceleration vector $\Omega_{cm}$ of the helicopter's center mass, cm. Referring to FIG. 3, there is shown one arrangement of the transducers or sensors utilized by the present invention that includes six (6) accelerometers and one shaft position indicator. The system can be expanded to accommodate additional accelerometers and shaft position indicators. In many cases the accelerometers can be arranged in a cube which is mounted so as to allow direct computation of three orthogonal translational and three orthogonal rotational accelerations as will be described below. Examples of commercially available suitable accelerometers are the Vibro-Meter Model 507 or 508.

The actual installation of the transducer must be rigidly attached to the rotor support structure (helicopter) ideally near the center of gravity of the helicopter. The (x, y, z) position of each accelerometer (or the cube) with respect to the center of gravity of the helicopter must be known, as well as the positive sensing direction of each accelerometer and the accelerometer sensitivity. Further, the tach "blip" position must be known (0° to 360°) in the helicopter reference frame, as must the "blip" pulse length in msec and the expected "blip" voltage level.

The sensor array shown in FIG. 3 utilizes 6 one degree of freedom accelerometers which are mounted in pairs. The six uniaxial accelerometers are mounted in convenient positions around the rigid framework keeping in mind that each accelerometer (groups of two) will have its sensitive axes parallel to one of the reference axes. The location of each accelerometer will be specified as follows:

1. Pick a reference point that can be any convenient point on the rigid framework (a bolt head for example). If a point is chosen having known coordinates with respect to the rest of the helicopter, processing is simplified. More specifically, knowing the coordinates of both the reference point and the center of mass, the transformation vector $r_{ref/cm}$ can be readily determined.

2. From this reference point, which now has a reference coordinate system that is parallel to the global coordinate system of the helicopter, the Cartesian coordinates of the location of each accelerometer may be determined. These coordinates are given by $r_{ab}$, where the subscript "a" denotes the accelerometer number and the second subscript "b" denotes the component axes.

Figure 4:
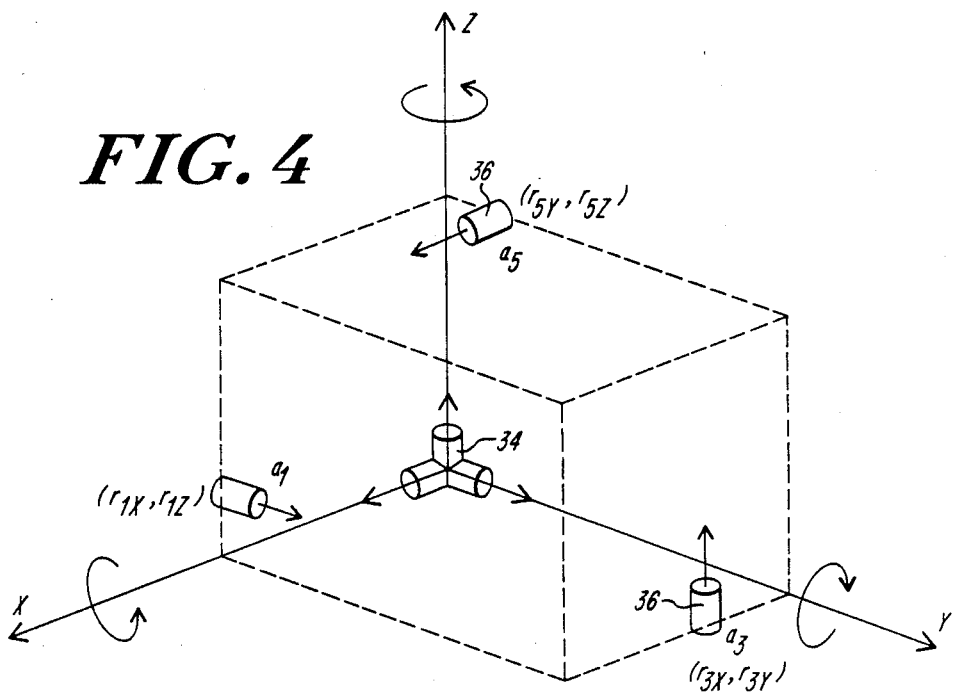
FIG. 4 is a simplified diagram showing the positioning of one triaxial and three one degree of freedom accelerometers utilized in alternate embodiment of the present invention.

The sensor array shown in FIG. 4 utilizes one triaxial accelerometer 34 and three one degree of freedom accelerometers 36. This array uses the location of the triaxial accelerometer 34 as the reference point. The output of the triaxial accelerometer 34 is sufficient to determine the translational acceleration vector of the reference point $A_{ref}$.

The advantage in using the array of FIG. 4 over the array of FIG. 3 is that array of FIG. 4 requires fewer sensor locations. The locations of three uniaxial accelerometers 36 are determined in the same manner as prescribed with respect to the sensor array shown in FIG. 3. The accelerometer arrangements shown in FIGS. 3 and 4 can be positioned on a single frame to form a six degree of freedom accelerometer, and such frame can be attached to the helicopter as a single entity.

For a system utilizing either sensor array, the magnitudes of the accelerometer vectors, as measured by the mounted accelerometers are given as $A_1$, $A_2$, $A_3$, $A_4$, $A_5$ and $A_6$ (where $A_i = K_i V_i$; $V_i$ equals the accelerometers output voltage and $K_i$ is the calibration coefficient for the ith accelerometer). The reference coordinate axes are parallel to the mass center coordinate axes. The position vector from the reference point to the center of mass is given by $r_{ref/cm}$, with components $X_{ref/cm}$, $Y_{ref/cm}$ and $Z_{ref/cm}$ measured from the reference point to the center of mass.

Figure 5:
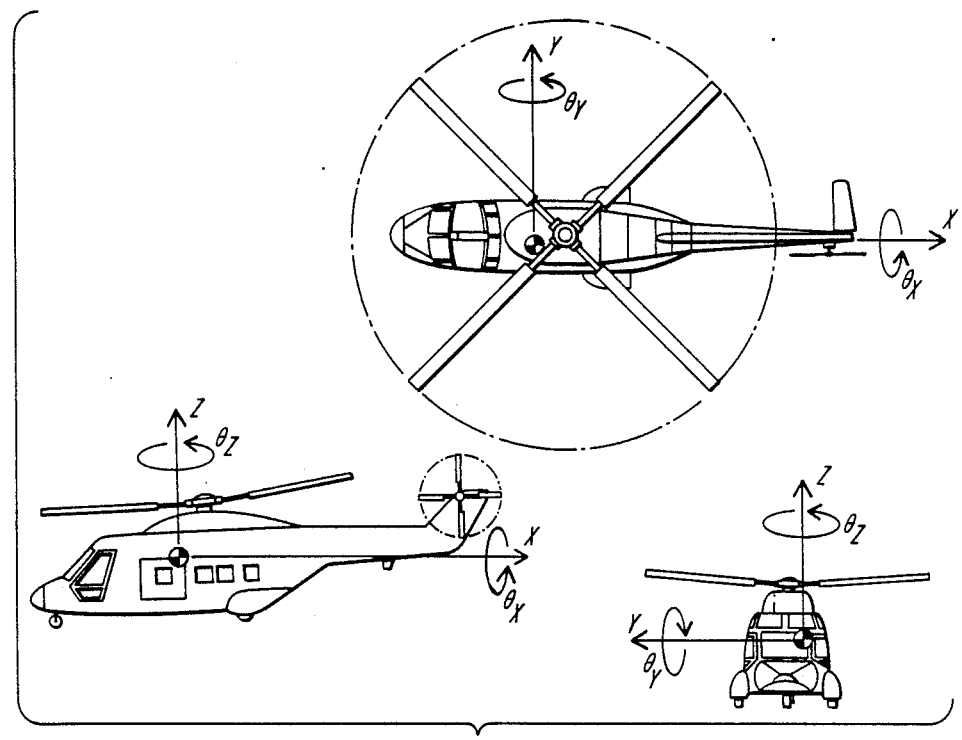
FIG. 5 are views showing three coordinate axes of the mass center with respect to the helicopter.

The calculated vectors $a_{ref}$ and $\Omega_{cm}$ are used with $r_{ref/cm}$ to calculate the translational acceleration vector of the center of mass $A_{cm}$. The coordinate axes of the center of mass with respect to the helicopter are shown in FIG. 5.

Referring now to the construction of the system as shown in FIG. 1, the signal conditioner 42 includes six preamplifiers 44 for preamplifying data input to the signal conditioner 42 from the six accelerometers of an accelerometer array. (Of course, if there are more accelerometers in the system, there would be equal number of preamplifiers). Six low pass filters 46 each connected to one of the preamplifiers 44 filter the data to 400 Hz. Six step gain circuits, one connected to each low pass filter 46 maintain the data at the optimal operating point of an A/D converter. A controller 50 is provided to control the operation of the step gain circuits 48, and the gain is not changed during data acquisition. Analog to digital converters 52 connected to the step gain circuits 48 convert the data to 12 bits for input to the signal processor 60.

In a preferred embodiment, the filtering and sampling parameters are selected such that all aliasing components shall be greater than 40 dB down and inband ripple shall be $\pm 1$ dB. The sample and hold, A/D converter 52, and gain control circuits 48 maintain the quantization noise at least 60 dB below the digitized data.

In a situation where strain gauges or other motion transducers are used in place of the accelerometer arrays, the signal conditioning can be adapted to accept the other sensors with preconditioning of the sensor signals possibly being required.

Signals from the tachometer (or multiple tachometers) are applied to a pulse-shaped filter 54 which will buffer and provide low pass filtering of the signals from the tachometer. A step gain circuit 56 receives signals from the pulse-shape filter 54 and in conjunction with the controller 50 controls the step gain of the signal and the signal is sampled in a manner tolerant to variations in tach signal-strength and waveform. A/D converter 58 converts the data to a form suitable for input to the signal processor 60.

In a preferred embodiment, the signal processor 60 includes a digital filter 62 for filtering all incoming data. In addition to the digital filter, the signal processor 60 includes a general purpose microprocessor 64, a floating point processor 66, a memory 68 and various interfaces. In a preferred embodiment the general purpose microprocessor is a Motorola 68010 processor with associated 68881 floating point processor capable of controlling the signal conditioners, interfacing with a host or lap top computer and supporting a high level language. The operational software is resident in an EPROM. Preferably, the memory 68 should be large enough to buffer, process and output a period of data up to 100 revolutions. It shall also hold the processing software, intermediate and buffered data for a digital-to-analog output. The controller includes input signal conditioner interface, output conditioner interface and a post-processor interface. The signal processing can also be performed by an array processor.

The post-processor 80 is preferably a lap top computer system (but can be fully integrated with the signal processor) which can be carried onto the helicopter (such as a Gridlite ™ system). At a minimum, this post-processor includes (1) memory, cpu and support hardware, (2) display, (3) keyboard, (4) floppy disk drive, (5) signal processor interface, (6) continuous time and date, (7) printer interface. The post processor must operate on battery power without recharge for complete data gathering flight.

Figure 6:
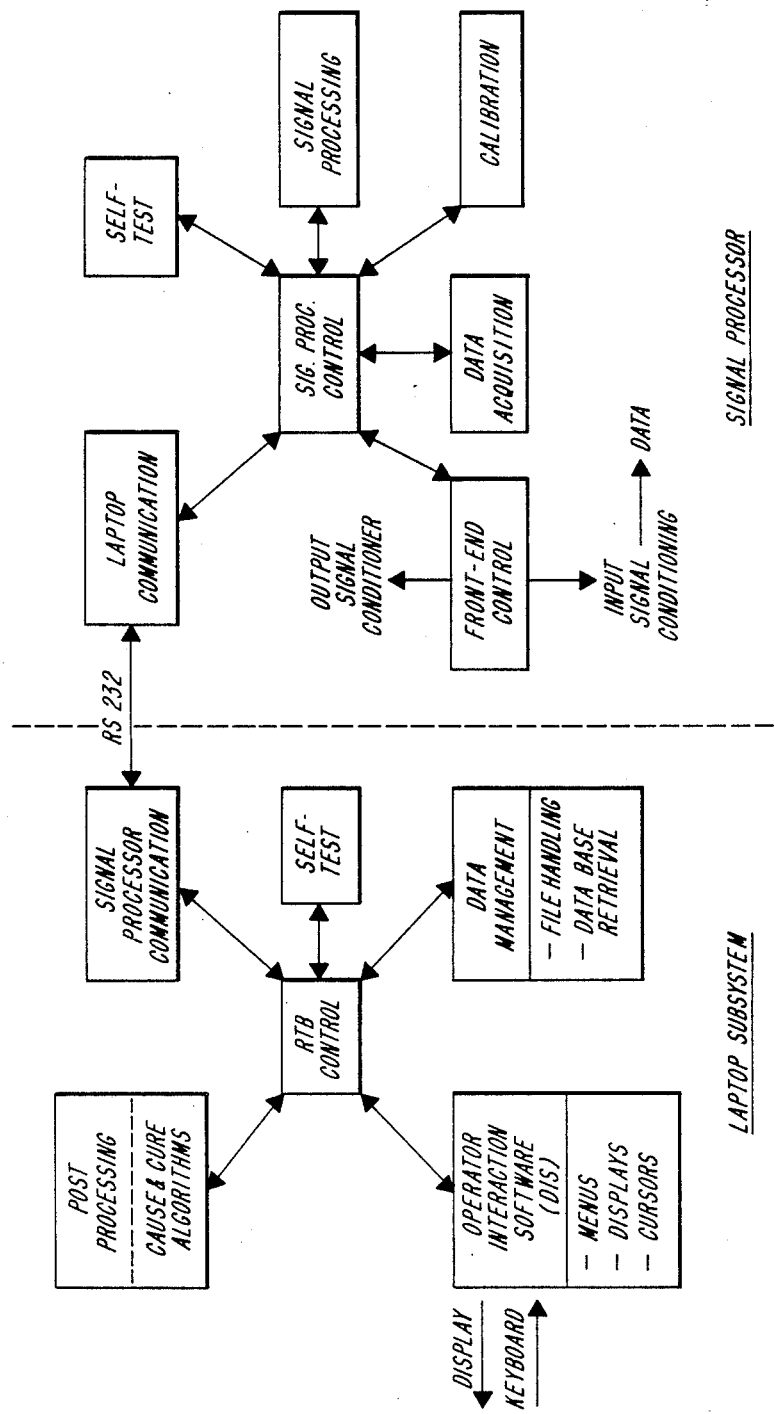
FIG. 6 is a simplified diagram of the functions of the signal processor and post processor of the system shown in FIG. 1.

The various functions of the system as divided between the signal processor 60 and the post processor 80 are shown in FIG. 6 The principal functions of the signal processor are (1) data acquisition and signal processing, (2) calibration, (3) self test and (4) data analysis. The principal functions of the post processor are (1) data management (2) execution of algorithms for determining optimum rotor adjustments, and (3) operator interfacing and communication.

The primary function of the data analysis and signal processing performed by the signal processor 60 is to generate the Fourier coefficients for a selectable number of revolutions of the helicopter rotor as described above. The Fourier coefficients are calculated for a selectable number of harmonics of the 1/REV fundamental. These coefficients (magnitude and phase) are then incoherently averaged for a selectable period and sent to the post-processor for storage.

In addition to the processing of data from the motion transducer (sensor array) discussed above, the signal processor must also process signals from the shaft position indicator. If a tachometer is used as the shaft position indicator the following method may be used to determine the shaft position. Once the data has been acquired, tachometer processing is performed to determined the exact occurrence, in time, of the first N tach pulses. That processing takes the following form: Letting $t_n$ be the sample tach signal, as a sliding window Sum on n $$A_n = 1/K \sum_{k=0}^{K-1} |t_{n-k}| \quad (23)$$

and $$B_n = 1/K \sum_{k=K}^{2K-1} |t_{n-k}| \quad (24)$$

is formed where 2K is chosen to select match the tach pulse width. Adding $$SUM_n = A_n + B_n \quad (25)$$

Where $SUM_n$ is greater than some threshold, a pulse is detected. Upon a threshold exceedance, the tach pulse center shall be computed as $$D_n = A_n - B_n \quad (26)$$

$D_n$ will be less than 0 entering the pulse and greater than 0 leaving the pulse. It passes through 0 at the pulse center. The nearest tach pulse index ($n_0$) shall be defined as the pulse location. This processing is repeated for a selectable number of revolutions. The accelerometer data is then processed to coincide with these locations.

If $N_i$, i=1, $N_{REV}$ are those locations, then the associated Fourier transform processing record lengths $NA_i$ are then given by $$NA_i = \frac{n_{i+1} - n_i \cdot fs_{acc}}{fs_{tach}} \quad (27)$$

where
$fs_{tach}$ = sampling rate of tachometer.
$fs_{acc}$ = sampling rate of accelerometer
[ ]=>closest integer ---.

The tachometer processing then computes the acceleration data starting address associated with $n_0$.

For each rotation, the tachometer processing computes the record length of the accelerometer data $NA_i$. For each of the record lengths, the accelerometer processing then computes the associated fundamental frequencies given by:

$$(f_1)_i = \frac{fs_{tach}}{(n_{i+1} - n_i)} = \frac{fs_{tach}}{\Delta N_i} \quad (28)$$

and
$$(f_m)_i = (mF_0)_i \quad (29)$$

where m is an input parameter representing the number of harmonics, and i is the rotation index.

$$(Y_{fm}) = \sum_{n=0}^{NA_i-1} a_{nk} e^{\frac{-j2\pi nm}{NA_i}} \quad (30)$$
$$m = 0, 1, \ldots, M$$

where
$a_n$ is the accelerometer time data $= Ae^{j2\pi\hat{f}n\Delta t}e^{j\phi}e_{j2\pi\hat{f}t}$
$\phi$ is the phase imbalance,
$\epsilon$ is the time offset such that $|\epsilon| \leq 1/fs_{acc}$
$j = \sqrt{-1}$
i is the time record, and
k is the channel index.
This equation can be rewritten as:

$$(Y_{fm})_{ik} = A\, e^{j2\pi f\hat{f}} e^{j\phi} \sum_{n=1}^{NA_i} e^{j2\pi f/fs} e^{\frac{-j2\pi nm}{Na_i}} \quad (31)$$

Summing the series in (31) yields:

$$(Y_{fm})_{ik} =$$

$$(Ae^{j\phi})(e^{j2\pi\epsilon\hat{f}}) \left[ \frac{\sin NA_i\pi\left[\frac{\hat{f}}{f_s} - \frac{m}{NA_i}\right]}{\sin \pi\left[\frac{\hat{f}}{f_s} - \frac{m}{NA_i}\right]} \right] e^{j\pi(n-)\left[\frac{\hat{f}}{f_s} - \frac{m}{NA_i}\right]}$$

where term $(Ae)^{j\phi}$ is the desired output, and $\hat{f}$ and $\epsilon$ are know from the tach.

The process is repeated for the next $NA_i$ accelerometer samples. Note that the $(fm)_i$'s may be different from record to record due to different $N_i$'s (rotation periods).

At the end of each rotation period, the Fourier coefficients shall be coherently added frequency by frequency:

$$[IY_{fm}]_{ik} = [IY_{fm}]_{(i-1)k} + [Y_{fm}]_{ik} \quad (32)$$

where i=rotation number and m =frequency, and IY is the integrated output.

At the end of the selected coherent averaging time, the magnitude and phase of the coefficient shall be calculated as $$Z_{fmk} = |IY_{Fmik}| \tag{33}$$

$$AL_{fm} = \tan^{-1}\left[\frac{I_m[IY_{fmik}]}{Re[IY_{fmik}]}\right] \tag{34}$$

These components are then calibrated and incoherently averaged with the coefficients from the next data snapshot as selected. At each frequency (fm) the accelerometer channels are then combined through summing, differencing and multiplication to form the six components of the motion of the rotor support structure. Upon completion, the calibrated average Fourier coefficients are sent to the post processor for storage. As described earlier, these coefficients are then used to determine the acceleration due to a given rotor adjustment and a complete set of such coefficients are used to determine the optimum combination of rotor adjustments for minimizing vibration of the rotor support structure.

While the foregoing invention has been described with reference to its preferred embodiments, various alterations and modifications will occur to those skilled in the art. Also, while the description presented above has been directed primarily to a helicopter main rotor, the system and method may also be utilized in connection with multiple main rotors, tail rotors or propellers on other types of aircraft, marine propellers, and fans and the like used in other types of apparatus. Also, while the system has been described as including six accelerometers or other motion sensors, a smaller number may be employed when it is determined that one or more degrees of freedom of motion of the rotor support structure are either not substantially influenced by the rotor adjustments or not of concern to the user. In addition, in cases where more than on rotor is being smoothed using the system and method of the present invention and/or when there exists mechanical coupling between such multiple rotors, the number of sensors and processing channels may be increased to account for such effects. The system and method may be modified to account for an elastic deformation of the support structure. All such modifications and alterations are intended to fall in the scope of the appended claims.

What is claimed is:

1. A system for minimizing vibration or stress in an apparatus including a rotor to which rotating blades are attached, said system comprising:
   means for calculating the effects of unit mechanical adjustments on the force and moment exerted by the rotor on a support structure of the rotor;
   means for determining up to three components of force and up to three components of moment generated by the rotor;
   means for detecting the angular position of a shaft of said rotor;
   means for processing signals produced by said means for determining said components of force and moment and by said means for detecting the angular position of said shaft to produce Fourier coefficients of said force and moment;
   means for determining, through the use of said Fourier coefficients, the optimum mechanical adjustments that will result in the minimum vibration in the support structure for the rotor;
   means for prescribing adjustments to the blades in accordance with said optimum mechanical adjustments.

2. The system for minimizing vibration or stress in an apparatus of claim 1 wherein said means for determining components of force and moment comprises up to six accelerometers positioned to resolve up to six degrees of freedom of motion of the rotor support structure.

3. The system for minimizing vibration or stress in an apparatus of claim 1 wherein said means for detecting force and moment are positioned substantially at the center of mass of the rotor support structure.

4. The system for minimizing vibration or stress in an apparatus of claim 1 wherein a prescribed adjustment of the setting of a blade is a changing of the length of a pitch length for said blade in order to change the angel of attack of said blade.

5. The system for minimizing vibration or stress in an apparatus of claim 1 wherein a prescribed adjustment of the setting of a blade is a bending, in an upward or downward direction, of a tab or section on the trailing edge of said blade.

6. The system for minimizing vibration or stress in an apparatus of claim 1 wherein a prescribed adjustment of the setting of a blade is an adding or removing of the weights to the blade at specified locations on the blade or hub.

7. The system for minimizing vibration or stress in an apparatus of claim 1 wherein said means for calculating the effects of unit mechanical adjustments comprises means for obtaining a measure of the total force and moment on the rotor hub which includes the force and moment exerted by the untuned rotor on the support structure and the force and moment resulting from each type of adjustment.

8. The system for minimizing vibration or stress in an apparatus of claim 7 wherein said means for obtaining a measure of the total force and moment comprises means for calculating:

$$a + \sum_{j=1}^{N} a_j$$

where
$a_j$ = force/moment due to unit value of the jth allowed adjustment to one blade and
N = the number of allowed adjustments to one blade.

9. The system for minimizing vibration or stress in an apparatus of claim 8 wherein said means for determining the optimum mechanical adjustments comprises means to minimize:

$$\left| a_n + \sum_{j=1}^{N} A_{nj} F_{nj} \right|^2$$

where
$a_n$ = the Fourier coefficient of the force/moment at the nth harmonic of rotation of the rotor;
$A_{nj}$ = nth term is the discrete Fourier series of the jth set of allowed rotor blade adjustments (j = i, ..., N)
$F_{nj}$ = nth harmonic of the force/moment generated by the rotor due to a unit adjustment of type j.

10. The system for minimizing vibration or stress in an apparatus including a rotor of claim 1 further comprising:
   means for calculating a weighted average of the mean-square components of force and moment at a plurality of flight or operating conditions;
   means for determining a set of optimum blade adjustments that minimize said weighted average.

11. The system for minimizing vibration or stress in an apparatus including a rotor of claim 1 wherein said means for determining the optimum mechanical adjustments comprises means for calculating:

$$\alpha_{bj} = \frac{1}{B} \sum_{b=0}^{B-1} A_{bj} e^{ibn\Delta}$$

$\alpha_{bj}$ = the actual optimum amount of prescribed unit blade adjustments of the jth type to the b blade
$A_{nj}$ = nth term in descrete Fourier series of the jth set of allowed rotor blade adjustments (j = 1, ..., N).

12. A method for minimizing vibration or stress in an apparatus including a rotor having a plurality of blades, said method comprising the steps of:
   calculating the effects of unit mechanical adjustments on the force and moment exerted by the rotor on a support structure of the rotor;
   determining up to three components of force and up to three components of moment generated by the rotor;
   detecting the angular position of a shaft of said rotor;
   processing signals representing components of force and moment and signals representing the angular position of said shaft to produce Fourier coefficients of said force and moment;
   determining the optimum mechanical adjustments of the rotor for minimizing vibration in the support structure for the rotor, said optimum adjustments being a derived from said produced Fourier coefficients of motion and from said calculated effects of unit mechanical adjustments of the blades;
   adjusting to the blades in accordance with said optimium mechanical adjustments.

13. The method for minimizing vibration or stress in an apparatus of claim 12 wherein said step of determining the components of force and moment comprises positioning up to six accelerometers to resolve up to six degrees of freedom of motion of the support structure of the rotor.

14. The method for minimizing vibration or stress in an apparatus of claim 12 further comprising the step of positioning a device for determining force and moment generated by the rotor substantially at the center of mass of the rotor support structure.

15. The method for minimizing vibration or stress in an apparatus of claim 12 wherein said step of adjusting comprises changing the length of a pitch link for said blade in order to change the angle of attack of said blade.

16. The method for minimizing vibration or stress in an apparatus of claim 12 wherein said step of adjusting comprises bending, in an upward or downward direction, a tab or section on the trailing edge of said blade.

17. The method for minimizing vibration or stress in an apparatus of claim 12 where said step of adjusting comprises adding or removing weights to the blade at specified locations on the blade or hub.

18. The method for minimizing vibration or stress in an apparatus of claim 12 wherein said step of calculating the effects of unit mechanical adjustments of the blades of the rotor comprises the step of obtaining a measure of the total force and moment on the rotor which includes the force and moment exerted by the untuned rotor on the rotor support structure plus the force and moment resulting from each type of adjustment.

19. The method for minimizing vibration or stress in an apparatus of a claim 18 wherein said step of obtaining a measure of total force and moment comprises the step of calculating:

$$a + \sum_{j=1}^{N} a_j$$

where
$a_j$ = force/moment due to unit value of jth allowed adjustment to one blade, and
N = the number of allowed adjustments to one blade.

20. The method for minimizing vibration or stress in an apparatus of claim 19 wherein said step of determining the optimum mechanical adjustments of the blades comprises the step of minimizing:

$$\left| a_n + \sum_{j=1}^{N} A_{nj} F_{nj} \right|^2$$

where
$a_n$ = the Fourier coefficient of the force/moment at the nth harmonic of rotation of the rotor;
$A_{nj}$ = nth term is the discrete Fourier series of the jth set of allowed rotor blade adjustments (j = i, ..., N)
$F_{nj}$ = nth harmonic of the force/moment generated by the rotor due to a unit adjustment of type j.

21. The method for minimizing vibration or stress in an apparatus including a rotor of claim 20 further comprising the steps of:
   calculating a weighted average of the mean square components of force and moment at a plurality of flight or operating conditions;
   determining a set of optimum blade adjustments that minimize said weighted average.

22. The method for minimizing vibration or stress in an apparatus of claim 12 wherein said step of determining the optimum mechanical adjustments comprises the step of calculating:

$$\alpha_{bj} = \frac{1}{B} \sum_{b=0}^{B-1} A_{bj} e^{ibn\Delta}$$

$\alpha_{bj}$ = the actual optimum amount of prescribed unit blade adjustments of the jth type to the b blade
$A_{nj}$ = nth term in descrete Fourier series of the jth set of allowed rotor blade adjustments (j = 1, ..., N).

* * * * *